United States Patent
Daioku (10) Patent No.: US 8,925,032 B2
(45) Date of Patent: Dec. 30, 2014

(54) AV OUTPUT SYSTEM PERFORMING VIDEO OUTPUT

(75) Inventor: Shuji Daioku, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/634,558

(22) PCT Filed: Apr. 1, 2011

(86) PCT No.: PCT/JP2011/058404
§ 371 (c)(1),
(2), (4) Date: Sep. 13, 2012

(87) PCT Pub. No.: WO2011/138884
PCT Pub. Date: Nov. 10, 2011

(65) Prior Publication Data
US 2013/0010195 A1  Jan. 10, 2013

(30) Foreign Application Priority Data
May 7, 2010  (JP) ................................ 2010-107378

(51) Int. Cl.
*H04N 7/16* (2011.01)
*H04N 5/775* (2006.01)
*H04N 21/433* (2011.01)
*H04N 21/41* (2011.01)
*H04N 5/765* (2006.01)

(52) U.S. Cl.
CPC ........... *H04N 5/775* (2013.01); *H04N 21/4333* (2013.01); *H04N 21/4126* (2013.01); *H04N 5/765* (2013.01)
USPC ............. 725/141; 725/151; 725/39; 725/143; 348/552; 455/557; 455/566; 455/567

(58) Field of Classification Search
CPC ................... H04N 21/4126; H04N 21/41407; H04N 5/775; H04N 7/141
USPC ..................................................... 725/39, 142
See application file for complete search history.

(56) References Cited

U.S. PATENT DOCUMENTS

| 8,181,218 B2 * | 5/2012 | Asmussen .................... 725/142 |
| 2010/0180298 A1 * | 7/2010 | Kim et al. ..................... 725/39 |
| 2010/0222102 A1 * | 9/2010 | Rodriguez ..................... 455/557 |

FOREIGN PATENT DOCUMENTS

| JP | 2003-348175 A | 12/2003 |
| JP | 2004-80729 A | 3/2004 |
| JP | 2005-287013 A | 10/2005 |
| JP | 2009-111555 A | 5/2009 |
| JP | 2009-303242 A | 12/2009 |
| JP | 2010-4326 A | 1/2010 |

* cited by examiner

*Primary Examiner* — Jefferey Harold
*Assistant Examiner* — Omer Khalid
(74) *Attorney, Agent, or Firm* — Birch, Stewart, Kolasch & Birch, LLP (57) ABSTRACT

If an incoming call arrives at a mobile phone as an AV output device while a video signal is output to a TV as an AV input device, as incoming call processing, a command notifying arrival of the incoming call is transmitted to the TV, and thereafter output of the video signal is stopped. The reason for the stop is displayed on the TV. When the call is terminated in the mobile phone, a command notifying termination of the call is transmitted to the TV, and the output of the video signal is resumed. Thereby, a notification screen is stopped on the TV, and reproduction of video is resumed.

6 Claims, 5 Drawing Sheets

AV OUTPUT SYSTEM PERFORMING VIDEO OUTPUT

TECHNICAL FIELD

The present invention relates to an AV output system, an AV output device, and an AV input device, and in particular to an AV output system performing video output by connecting an AV output device and an AV input device, and the AV output device and the AV input device used for the system.

BACKGROUND ART

For example, Japanese Patent Laying-Open No. 2005-287013 (Patent Literature 1) and the like have conventionally proposed an AV output system which, by performing communication between a mobile phone and a television set (hereinafter also referred to as a TV) connected in an analog manner, transmits a video signal from the mobile phone to the TV and reproduces video on the TV side.

CITATION LIST

Patent Literature

PTL 1: Japanese Patent Laying-Open No. 2005-287013

SUMMARY OF INVENTION

Technical Problem

In such an AV output system, however, if an interrupt event occurs which disables output of the video signal to the TV, such as if an incoming call arrives at the mobile phone, reproduction of the video is stopped on the TV side. Although occurrence of the event is notified on a display of the mobile phone for example by arrival of the incoming call on this occasion, the reproduction of the video is suddenly stopped on the TV side, and thus a user viewing the TV does not understand the reason why the reproduction has been stopped.

The present invention has been made in view of such a problem, and one object of the present invention is to provide an AV output system, an AV output device, and an AV input device that are user-friendly.

Solution to Problem

To achieve the above object, according to an aspect of the present invention, an AV output system has an AV output device and an AV input device, and includes: an output unit for outputting a video signal and a control signal from the AV output device to the AV input device; a reproduction unit for reproducing and outputting the video signal in the AV input device; a first control unit for stopping, when occurrence of a predetermined event is detected by the AV output device, output of the video signal from the AV output device to the AV input device, and outputting a control signal corresponding to the occurrence of the event to the AV input device; and a notification unit for performing notification, when the control signal corresponding to the occurrence of the event is received by the AV input device, using prestored information corresponding to the control signal.

Preferably, the AV output system further includes a second control unit for performing display on an indicator of the AV input device, wherein, when the second control unit receives the control signal corresponding to the occurrence of the event during processing for causing the indicator to display a screen obtained by reproducing the video signal at the reproduction unit, the second control unit causes the indicator to perform display corresponding to the control signal corresponding to the occurrence of the event, in accordance with the control signal.

Preferably, the first control unit stops video output from the AV output device to the AV input device after the first control unit outputs the control signal corresponding to the occurrence of the event from the AV output device to the AV input device.

Preferably, the notification unit performs the notification in accordance with the control signal corresponding to the occurrence of the event, also after the reproduction of the video signal is stopped.

Preferably, when processing of the event is completed in the AV output device, the first control unit outputs a control signal corresponding to completion of the processing of the event from the AV output device to the AV input device, and when the control signal corresponding to the completion of the processing of the event is received by the AV input device, the notification unit terminates the notification.

Preferably, the event is processing started without requiring user operation of the AV output device.

According to another aspect of the present invention, an AV output device includes: a first output unit for outputting a video signal to an AV input device; a second output unit for outputting a control signal to the AV input device; a processing unit for processing an event; and a control unit for controlling output at the first output unit and output at the second output unit. The control unit executes first control for outputting the video signal at the first output unit to the AV input device, and second control for stopping, when occurrence of the event is detected during execution of the first control, the execution of the first control, and outputting a control signal corresponding to the occurrence of the event at the second output unit to the AV input device.

Preferably, when processing of the event at the processing unit is completed, the control unit outputs a control signal corresponding to completion of the processing of the event to the AV input device, and resumes the stopped first control.

Preferably, the event is processing started without requiring user operation of the AV output device.

According to still another aspect of the present invention, an AV input device includes: a reception unit for receiving a signal transmitted from an AV output device; a control unit for performing processing in accordance with a control signal received from the AV output device; and a memory for storing data used for the processing. The control unit executes first control for reproducing a video signal received from the AV output device and outputting the video signal to an indicator, and second control for performing notification, when a control signal corresponding to occurrence of a predetermined event is received from the AV output device during execution of the first control, using the data stored in the memory to correspond to the control signal.

Preferably, when a control signal corresponding to completion of processing of the predetermined event is received from the AV output device after the execution of the second control, the control unit terminates the notification.

According to still another aspect of the present invention, a notification method is a notification method in an AV output system having an AV output device and an AV input device, including the steps of: outputting a video signal and a control signal from the AV output device to the AV input device; reproducing and outputting the video signal in the AV input device; when occurrence of a predetermined event is detected by the AV output device, stopping output of the video signal from the AV output device to the AV input device, and outputting a control signal corresponding to the occurrence of the event to the AV input device; and when the control signal corresponding to the occurrence of the event is received by the AV input device, performing notification using prestored information corresponding to the control signal.

Advantageous Effects of Invention

According to the present invention, if output of a video signal from a mobile phone is stopped and reproduction thereof on a television set is interrupted, a user can clearly understand the reason therefor from output on the television set. In addition, the user can take action on the mobile phone quickly and appropriately, as necessary.

DESCRIPTION OF EMBODIMENTS

Hereinafter, an embodiment of the present invention will be described with reference to the drawings. In the description below, identical parts and components will be designated by the same reference numerals. Their names and functions are also the same.

Figure 1:
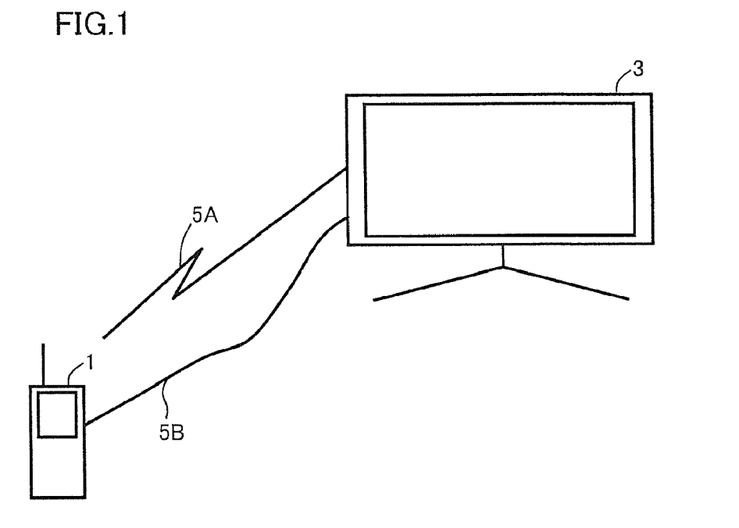
FIG. 1 is a view showing a concrete example of a configuration of an AV output system in accordance with the present embodiment.

FIG. 1 is a view showing a concrete example of a configuration of an AV output system in accordance with the present embodiment. Referring to FIG. 1, the AV output system in accordance with the present embodiment includes a mobile phone 1 as an AV output device, and a television set (hereinafter abbreviated as a TV) 3 as an AV input device, which are communicably connected.

The AV output device is not limited to the mobile phone, and any other device may be used as long as it is a video output device in which interrupt processing may occur, including user operation such as operation on a remote controller. Examples of the AV output device other than the mobile phone include video output devices such as a fixed-line videophone, a game machine, a video player, a hard disk recorder, a PC (personal computer), and an electronic book reader. Further, since the "video" may include audio as described later, the AV output device may be a device outputting only audio, such as a fixed-line phone or an audio device.

Similarly, the AV input device is not limited to the TV, and any other device may be used as long as it is a display device which can receive a control signal together with a video signal and an audio signal. Examples of the AV input device other than the TV may include a display for a PC, and a device performing both video input and video output such as a hard disk recorder used by being connected to a display device.

Communication between mobile phone 1 and TV 3 includes a communication circuit 5A for transmitting a video signal from mobile phone 1 to TV 3 as a first communication circuit, and a communication circuit 5B for transmitting a control signal (command) from mobile phone 1 to TV 3 as a second communication circuit. Examples of communication technology in communication circuit 5A include communication technology utilizing a HDMI (High-Definition Multimedia Interface) (registered trademark), wireless LAN (Local Area Network) technology, infrared-ray communication technology, and visible light communication technology. Examples of communication technology in communication circuit 5B include communication technology utilizing the HDMI (registered trademark), wireless LAN technology, and Bluetooth (registered trademark).

In this example, mobile phone 1 outputs the command and the video signal to TV 3 using different communication circuits, by means of different communication methods. However, they may be output utilizing the same communication circuit, by means of the same communication method.

The video signal output from mobile phone 1 to TV 3 may be for only video such as a moving image or a still image, may be for video and audio, or may be for only audio. When mobile phone 1 causes TV 3 to perform video output, mobile phone 1 outputs the video signal to TV 3 using communication circuit 5A, and outputs the control signal for causing TV 3 to reproduce the video signal to TV 3 using communication circuit 5B. If communication circuit 5B is a communication circuit utilizing the HDMI, mobile phone 1 transmits the command utilizing a CEC (Consumer Electronics Control) standard.

Figure 2:
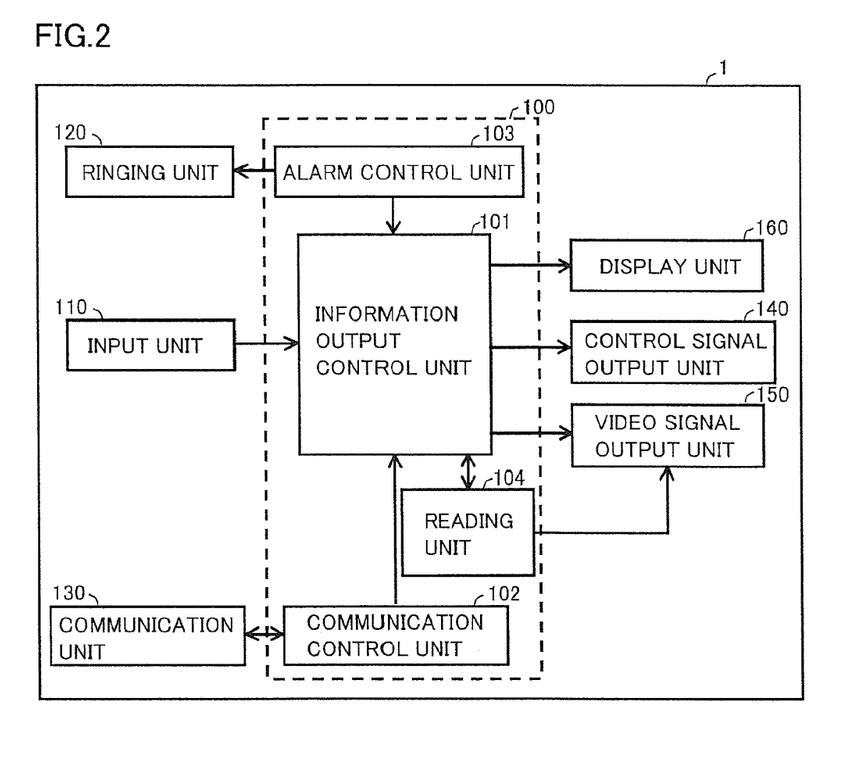
FIG. 2 is a block diagram showing a concrete example of a configuration of functions of a mobile phone included in the AV output system in accordance with the present embodiment.

FIG. 2 is a block diagram showing a concrete example of a configuration of functions of mobile phone 1. Referring to FIG. 2, mobile phone 1 includes a control unit 100 which includes a CPU (Central Processing Unit) not shown, executes a program stored in a memory, and thereby controls the whole, an input unit 110 as a mechanism for receiving operation input such as numerical buttons, a ringing unit 120 as a component for outputting an alarm tone and performing vibration operation, a communication unit 130 as a component for making a phone call and transmitting and receiving an e-mail, a control signal output unit 140 as a component for outputting the control signal (command) using communication circuit 5B, a video signal output unit 150 as a component for outputting the video signal using communication circuit 5A, and a display unit 160 such as a liquid crystal display. These may each be implemented by hardware, or at least some of them may be implemented by software.

Further, control unit 100 includes an information output control unit 101 as a function for causing TV 3 to perform video output and a function for controlling display on display unit 160, a communication control unit 102 for controlling the making of a phone call and the transmission and reception of an e-mail at communication unit 130, an alarm control unit 103 for managing a schedule and an alarm and controlling the ringing at ringing unit 120, and a reading unit 104 for reading the prestored video signal from the memory not shown. These may be implemented by software by the CPU not shown at control unit 100 executing the program stored in the memory, or at least some of them may be implemented by hardware.

When communication between mobile phone 1 and TV 3 is established, information output control unit 101 sets output at control signal output unit 140 to a stand-by state, and causes the output to stand by until input unit 110 receives operation input.

If input unit 110 receives operation input instructing to cause display unit 160 to reproduce a video signal, information output control unit 101 causes reading unit 104 to read a designated video signal from the memory not shown, and causes display unit 160 to display the same. If the video signal includes audio, information output control unit 101 causes the audio to be output from a speaker not shown.

If the operation input received at input unit 110 instructs to cause TV 3 to reproduce a video signal, information output control unit 101 causes reading unit 104 to read a designated video signal from the memory not shown, and causes video signal output unit 150 to output the same. On this occasion, information output control unit 101 may simultaneously cause display unit 160 to display the image based on the signal.

If the operation input received at input unit 110 instructs reproduction of continuous video, for example reproduction of a moving image, on TV 3, information output control unit 101 causes video signal output unit 150 to continuously output a specified video signal for each predetermined data size.

Here, if an event occurs in mobile phone 1, a notification screen is displayed on display unit 160 in mobile phone 1. An event to be notified refers to processing which requires user operation when it is started, and concrete examples of occurrence thereof include detection of arrival of an incoming call, detection of an alarm time, and the like.

Accordingly, if such an event occurs while the reproduction of continuous video as described above is performed on TV 3, transmission of the video signal from mobile phone 1 to TV 3 is stopped. Thus, when the transmission of the video signal is stopped due to occurrence of such an event, mobile phone 1 in accordance with the present embodiment transmits a command indicating the reason for the stop to TV 3.

Specifically, if a predefined event which will stop the transmission of the video signal occurs, communication control unit 102 and alarm control unit 103 output a signal indicating the occurrence to information output control unit 101. If information output control unit 101 receives the signal during the output of the video signal, information output control unit 101 causes video signal output unit 150 to stop the output of the video signal, and causes display unit 160 to display the notification screen. In addition, information output control unit 101 causes control signal output unit 140 to transmit a predefined command for notifying the occurrence of the event, and thereafter shifts an output state at control signal output unit 140 to the stand-by state or a stop (OFF) state.

It is noted that FIG. 2 simplifies the functions of the mobile phone in order to explain its functions in accordance with the present embodiment. Therefore, mobile phone 1 may include a function other than those shown in FIG. 2, such as a camera function.

Figure 3:
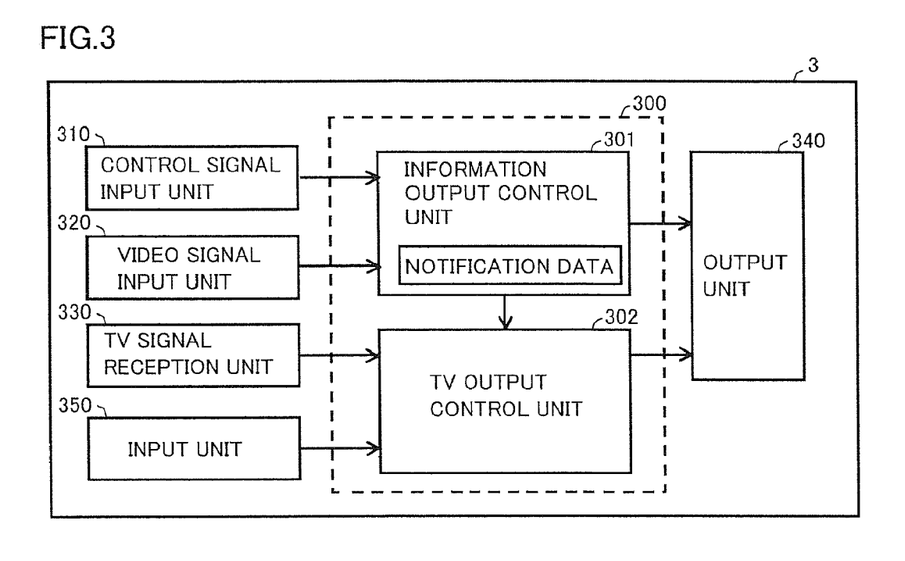
FIG. 3 is a block diagram showing a concrete example of a configuration of functions of a TV included in the AV output system in accordance with the present embodiment.

FIG. 3 is a block diagram showing a concrete example of a configuration of functions of TV 3. Referring to FIG. 3, TV 3 includes a control unit 300 which includes a CPU not shown, executes a program stored in a memory, and thereby controls the whole, a control signal input unit 310 as a component for receiving input of the control signal (command) transmitted using communication circuit 5B, a video signal input unit 320 as a component for receiving input of the video signal transmitted using communication circuit 5A, a TV signal reception unit 330 including an antenna and the like for receiving a TV signal, an output unit 340 such as a liquid crystal display, a speaker, and the like, and an input unit 350 as a component for receiving operation input such as input buttons and a remote controller reception unit. These may each be implemented by hardware, or at least some of them may be implemented by software.

Further, control unit 300 includes an information output control unit 301 as a function for causing output unit 340 to perform video output based on the video signal from mobile phone 1, and a TV output control unit 302 as a function for causing output unit 340 to perform video output based on the TV signal. These may be implemented by software by the CPU not shown at control unit 300 executing the program stored in the memory, or at least some of them may be implemented by hardware.

If input unit 350 receives operation input instructing reproduction of a TV signal, information output control unit 301 causes TV signal reception unit 330 to reproduce the received TV signal and causes output unit 340 to output the same.

Information output control unit 301 stores processing to be executed for each command from mobile phone 1, and if it receives a command, it executes processing corresponding to the command.

Specifically, if the video signal from mobile phone 1 is received at video signal input unit 320, information output control unit 301 reproduces the received video signal, and causes output unit 340 to output the same. If the video signal is continuously received from mobile phone 1 as described above, information output control unit 301 sequentially reproduces the video signal continuously received by video signal input unit 320. It is noted that, in addition to the video signal, a command instructing switching of input for switching to a state that allows the reproduction based on the video signal, as well as instructing sound volume, image quality setting, and the like, may be transmitted from mobile phone 1, and upon receiving such a command, video signal input unit 320 reproduces the video signal in accordance with the command.

Further, information output control unit 301 prestores data used for notification to correspond to a command indicating the reason for stopping the transmission of the video signal from mobile phone 1. If such a command is received at control signal input unit 310, information output control unit 301 causes output unit 340 to output display based on the data used for notification. Such display is, for example, a telop.

When such a command is received, information output control unit 301 maintains the display based on the notification information even after the reception of the video signal at video signal input unit 320 is stopped. It is noted that the notification is not limited to notification by display, and other output form such as sound may be used for the notification.

If the reception of the video signal at video signal input unit 320 is stopped, information output control unit 301 may input a signal indicating the stop to TV output control unit 302, and thereby the reproduction of the video signal may be switched to reproduction of a TV signal and the display on output unit 340 may be switched to a TV screen. Alternatively, such switching may be performed by user setting. It is noted that, even in such a case, information output control unit 301 preferably provides the display based on the notification information, in a manner superimposed on the TV screen, for a predefined time period, or until an operation signal instructing termination of the display is input.

Alternatively, on this occasion, information output control unit 301 may transmit to TV 3 a command instructing not to turn off a power source in association with turning off of external input, or to extend time that elapses before turning off of a power source. Thereby, even if TV 3 is an AV output device having a function that a power source is turned off in association with turning off of external input, time for which the above notification is provided can be ensured.

It is noted that FIG. 3 simplifies the functions of the TV in order to explain its functions in accordance with the present embodiment. Therefore, TV 3 may include a function other than those shown in FIG. 3, such as a communication function. Further, in the description below, the video signal will be described as including only video, for convenience of explanation. Thus, it is shown in FIG. 2 that mobile phone 1 includes video signal output unit 150, and it is shown in FIG. 3 that TV 3 includes video signal input unit 320. However, since the video signal may include audio as described above, naturally, mobile phone 1 may include an audio signal output unit, and TV 3 may include an audio signal input unit.

Figure 4:
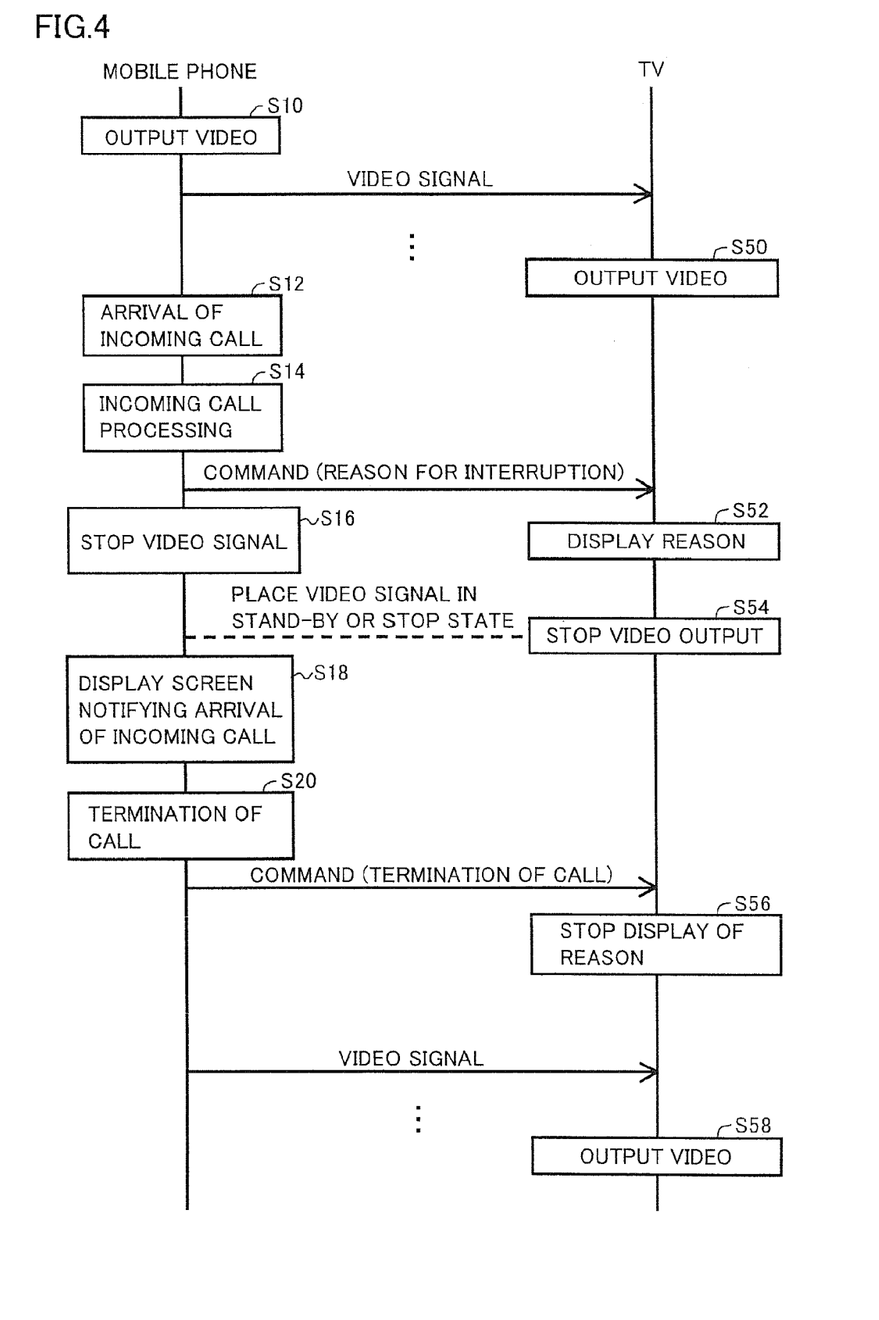
FIG. 4 is a view showing a concrete example of a flow of processing in the AV output system in accordance with the present embodiment.

FIG. 4 is a view showing a concrete example of a flow of processing in the AV output system in accordance with the present embodiment. The processing shown in FIG. 4 is processing that is started if input unit 110 of mobile phone 1 receives operation input instructing to reproduce a video signal on TV 3, and is implemented by each CPU executing the program stored in the memory to cause each unit shown in FIGS. 2 and 3 to function.

Referring to FIG. 4, if input unit 110 receives operation input instructing to reproduce a video signal on TV 3, mobile phone 1 executes processing for outputting video on TV 3 (step S 10). Specifically, a specified video signal is output from video signal output unit 150 to TV 3 using communication circuit 5A.

When TV 3 receives the video signal, TV 3 reproduces the video signal in accordance with a received command, and outputs video on output unit 340 (step S50). In this example, the video signal is continuously output from mobile phone 1, and continuously reproduced on TV 3.

If arrival of an incoming call is detected in mobile phone 1 during transmission of the video signal (step S12), mobile phone 1 executes incoming call processing (step S14). Specifically, a command indicating arrival of an incoming call as the reason for the shift of the communication state is output from control signal output unit 140 to TV 3 using communication circuit 5B.

Upon receiving the command, TV 3 executes processing for notifying the reason for stopping the reproduction, for example, by displaying a telop indicating the reason for stopping the reproduction of the video on output unit 340 (step S62). Thereby, the stop of the reproduction is notified on output unit 340 of TV 3.

Thereafter, mobile phone 1 stops the output of the video signal (step S 16). After mobile phone 1 stops the output of the video signal, mobile phone 1 displays a screen notifying the arrival of an incoming call on display unit 160 (step S 18).

Since the output of the video signal from mobile phone 1 is stopped, TV 3 stops display of the video output from mobile phone 1 (step S54). On this occasion, a screen on output unit 340 of TV 3 may be darkened, or, as another example, a TV signal of a predefined channel or a channel before the reproduction of the video output from mobile phone 1 may be reproduced. Further, as still another example, the reproduction may be resumed at sound volume and image quality setting before the reproduction of the video. Reproducing the TV signal before the reproduction of the video or returning to the sound volume and image quality setting before the reproduction of the video may be automatically performed in TV 3, or may be instructed as a command from mobile phone 1 to TV 3 and then performed in TV 3 in accordance with the command. Even in this case, information output control unit 301 of TV 3 causes output unit 340 to continue outputting display for notifying the stop of the reproduction. It is noted that TV 3 may have a function of not turning off a power source, or a function of extending time that elapses before turning off of a power source, during the notification. With this function, even if TV 3 is an AV output device having a function that a power source is turned off in association with turning off of external input, time for which the above notification is provided can be ensured. If termination of the incoming call is detected in mobile phone 1 in a state where communication circuit 5B is maintained (for example, in a state where a communication cable is connected) (step S20), mobile phone 1 shifts the output state at control signal output unit 140 from the stand-by state or the stop (OFF) state to an ON state, and outputs a command indicating the termination of the incoming call to TV 3. Upon receiving such a command, information output control unit 301 of TV 3 terminates the notification of the stop of the reproduction that has been output on output unit 340 (step S56).

Thereafter, a subsequent video signal and video from control signal output unit 140 are output from mobile phone 1 to TV 3. Thereby, TV 3 resumes the output of the video on output unit 340 (step S58). It is noted that, in addition to the video signal, a command instructing switching of input, sound volume, image quality setting, and the like may be transmitted from mobile phone 1, and upon receiving such a command, TV 3 reproduces the video signal in accordance with the command.

Since the above processing is executed in the AV output system in accordance with the present embodiment, even if an event that interrupts output of a video signal, such as arrival of an incoming call, occurs while the video signal is continuously output from mobile phone 1 and reproduced on TV 3, the reason for the interruption is notified on TV 3. This notification is implemented by transmitting a command indicating the occurrence of the event from mobile phone 1 to TV 3 when the occurrence thereof is detected, and thus the reason for the interruption is notified from TV 3 immediately before or simultaneously with the interruption of the reproduction of the video. It is noted that the notification may be provided immediately after the video signal is stopped. Therefore, even in a case where a user is viewing TV 3 without viewing a display screen of mobile phone 1, the user can clearly understand the reason why the reproduction has been interrupted. Further, in that case, the user can also understand that such an event has occurred in mobile phone 1, and can take action quickly and appropriately.

In the above example, such notification is implemented by prestoring notification data corresponding to a command in information output control unit 301 of TV 3. Thus, it is assumed that, for example, if an incoming call arrives at mobile phone 1, a command indicating the arrival is output, and a defined telop such as "A call has arrived" is displayed on output unit 340 of TV 3. It is also assumed that, at an alarm time, a defined telop such as "Alarm time" is displayed. However, information to be notified is not limited to only information prestored in TV 3.

As another example, a concrete content of an event may also be included in a command and notified on TV 3. For example, if the event that has occurred is arrival of an incoming call, a command including a caller's phone number may be output on TV 3. In this case, information output control unit 301 of TV 3 may prestore the notification data as a format for displaying the notification in combination with a caller's phone number, and display a telop such as "A call from phone number 1112222 has arrived" in combination with the caller's phone number read from the received command. Similarly, at an alarm time according to a schedule, a command including the schedule may be output on TV 3, and a telop such as "Bedtime" may be displayed. By providing such notification, even in the case where the user is viewing TV 3 without viewing the display screen of mobile phone 1, the user can understand the reason why the reproduction has been interrupted in more detail, and can take action quickly and appropriately.

Figure 5:
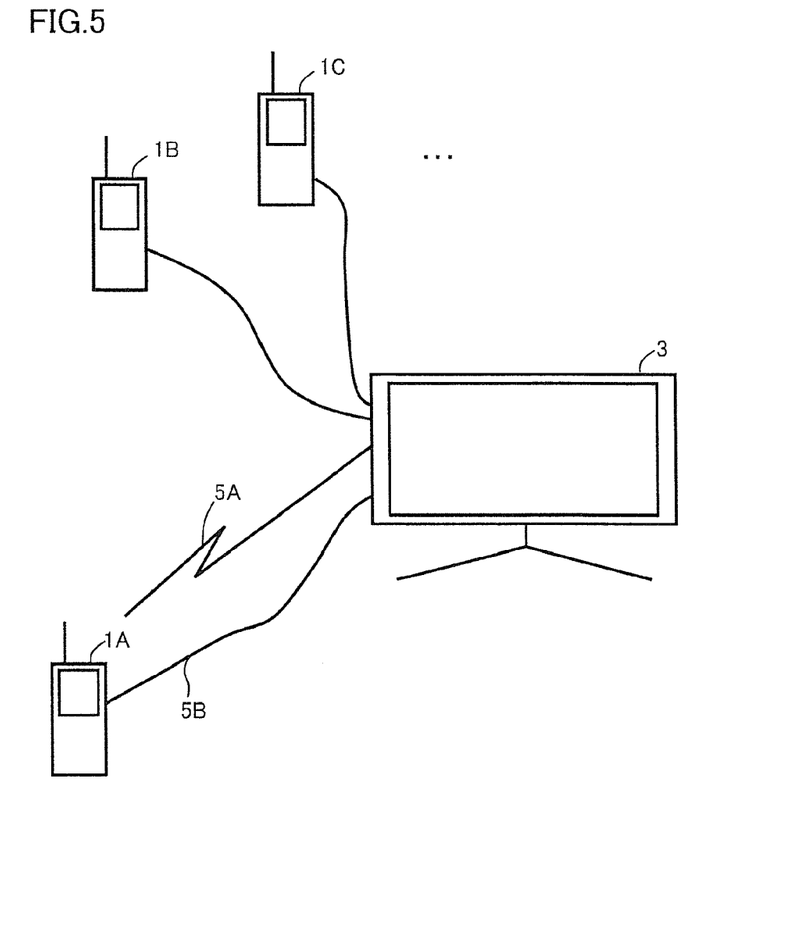
FIG. 5 is a view showing another concrete example of the configuration of the AV output system in accordance with the present embodiment.

Further, as another example, information identifying mobile phone 1 may also be notified on TV 3. As this example, a case where a plurality of mobile phones 1A, 1B, 1C, ... are connected to TV 3 as shown in FIG. 5 is assumed. In this case, a command output from mobile phone 1 may include information identifying the mobile phone, or the mobile phone may be identified based on a communication circuit used when a command is received in TV 3. Similarly, information output control unit 301 of TV 3 may prestore a format for displaying the notification in combination with a sender, and display a telop such as "A call has arrived at mobile phone 1" in combination with a sender of the command. By providing such notification, even in a case where a plurality of users connect their mobile phones to TV 3 as shown in FIG. 5 and are viewing TV 3 without viewing display screens of the mobile phones, the users can understand in which mobile phone an event that interrupts the reproduction has occurred and the content of the event in detail, and can take action quickly and appropriately.

Further, in the above example, if such an event occurs while the video signal is continuously output from mobile phone 1, the occurrence of the event is notified on TV 3. As another example of the timing for the notification, for example, when communication between mobile phone 1 and TV 3 is established immediately after the communication therebetween is started, notification information in mobile phone 1 may be transmitted as a command from mobile phone 1 to TV 3, and notified on TV 3. Examples of the information to be notified include information that an incoming call has arrived, information that an e-mail has been received, and the like.

Furthermore, in the above example, when the output of the video signal from mobile phone 1 is stopped, the command indicating the reason for the stop is output to TV 3, and examples of the event include detection of arrival of an incoming call, detection of an alarm time, and the like. However, as another event that occurs in mobile phone 1 during the output of the video signal, there is an event that does not immediately require user operation, such as arrival of an e-mail and a missed call. Thus, preferably in the AV output system, if such an event occurs in mobile phone 1, a command indicating the occurrence of such an event is output to TV 3 together with a command instructing the reproduction of the video signal, without stopping the output of the video signal. Thereby, the event can be notified on TV 3 together with reproduced video, for example by displaying a telop indicating the occurrence of the event such as "An e-mail has arrived" in a manner superimposed on display of the video on output unit 340. This can improve convenience of the user who is viewing TV 3 without viewing the display screen of mobile phone 1.

It is noted that, in the above example, the CPU not shown in TV 3 executes the program, and thereby a corresponding telop or the like is output in accordance with a command notifying the reason for interrupting the video signal from mobile phone 1. However, instead of the processing of displaying a telop or the like on the TV 3 side corresponding to the command, processing of producing a video signal prepared by synthesizing the video signal to be output with a telop or the like notifying the reason for interrupting the video signal on the mobile phone 1 side, outputting the synthesized video signal to TV 3, and thereafter stopping the output of the video signal is also conceived as another example. Thus, even if TV 3 does not include the above program, the reason for stopping the video signal is notified on output unit 340 before the video signal is stopped.

In addition, a program for causing mobile phone 1 to execute the processing shown in FIG. 4 and a program for causing TV 3 to execute the processing shown in FIG. 4 can each be provided. Such a program can be provided as a program product by being recorded in a computer-readable recording medium attached to a computer such as a flexible disk, a CD-ROM (Compact Disk-Read Only Memory), a ROM (Read Only Memory), a RAM (Random Access Memory), and a memory card. Alternatively, the program can be provided by being recorded in a recording medium such as a hard disk built in a computer. The program can also be provided by downloading through a network.

It is noted that the program in accordance with the present invention may be the one causing processing to be executed by invoking necessary modules among program modules provided as a part of an operation system (OS) of a computer, at predetermined timings in a predetermined array. In that case, the program itself does not include the above modules, and the processing is executed in cooperation with the OS. Such a program that does not include modules may also be included in the program in accordance with the present invention.

Further, the program in accordance with the present invention may be provided by being incorporated in a part of another program. Also in such a case, the program itself does not include modules included in the other program, and processing is executed in cooperation with the other program. Such a program incorporated in another program may also be included in the program in accordance with the present invention.

The provided program product is installed in a program storage unit such as a hard disk, and is executed. It is noted that the program product includes the program itself and a recording medium recording the program.

It should be understood that the embodiment disclosed herein is illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

1, 1A, 1B, 1C: mobile phone, 5A, 5B: communication circuit, 100, 300: control unit, 101, 301: information output control unit, 102: communication control unit, 103: alarm control unit, 104: reading unit, 110, 350: input unit, 120: ringing unit, 130: communication unit, 140: control signal output unit, 150: video signal output unit, 160: display unit, 302: output control unit, 310: control signal input unit, 320: video signal input unit, 330: signal reception unit, 340: output unit.

The invention claimed is:

1. An AV (Audio Visual) output system comprising:
a terminal device equipped with an AV output device; and
a display device equipped with an AV input device,
wherein, said terminal device includes:
   a reproduction unit for reproducing an image;
   a display unit for displaying said image reproduced by said reproduction unit;
   an output unit for outputting a video signal indicating said image reproduced by said reproduction unit to said AV input device; and
   an operation unit for receiving operation input;

wherein, said display device includes:
  a display unit; and
  a reproduction unit for reproducing said video signal received from said terminal device and outputting the reproduced video signal in said display unit;
wherein, said display unit of said terminal device displays a notification screen when occurrence of an interrupt event which starts without any user operations into said operation unit,
said output unit, when occurrence of said interrupt event is detected while said output unit outputs said video signal to said AV input device, outputs a control signal for notifying the occurrence of said event to said AV input device;
said AV input device performs notification by displaying notification information on said display unit of said display device, when the control signal for notifying the occurrence of said event is received by said AV input device, based on said notification information stored in a memory of said AV input device, said stored notification information being selected in accordance with said control signal,
when completion of processing of said event is detected after said occurrence of said interrupt event, said output unit outputs a control signal corresponding to completion of the processing of said event to said AV input device, and
when the control signal corresponding to the completion of the processing of said event is received by said AV input device, said AV input device terminates said notification by said display unit of said display device.

2. An AV (Audio Visual) output device, comprising:
a reproduction unit for reproducing an image;
a display unit for displaying said image reproduced by said reproduction unit;
a first output unit for outputting a video signal indicating said image reproduced by said reproduction unit to an AV input device;
an operation unit for receiving operation input;
a second output unit for outputting a control signal to said AV input device;
a processing unit for processing an interrupt event which starts without any user operations; and
a control unit for controlling output at said first output unit and output at said second output unit,
wherein said control unit executes:
  first control for outputting said video signal at said first output unit to said AV input device; and
  second control for stopping, when occurrence of said interrupt event is detected during execution of said first control, the execution of said first control, and outputting a control signal for notifying the occurrence of said event at said second output unit to said AV input device,
in said second control, said control unit stops video output to said AV input device after said control unit outputs said control signal for notifying the occurrence of said event to said AV input device, said control signal providing a predefined command being indicative of said event, said display unit of said AV output device displays a notification screen determined based on said predefined command when occurrence of said interrupt event requires user operation into said operation unit,
when processing of said event at said processing unit is completed, said control unit outputs a control signal corresponding to completion of the processing of said event to said AV input device, and resumes said stopped first control.

3. An AV (Audio Visual) input device, comprising:
a reception unit for receiving a signal transmitted from an AV output device;
a control unit for performing processing in accordance with a control signal received from said AV output device;
a display unit; and
a memory for storing notification information used for said processing,
wherein said control unit executes:
first control for reproducing a video signal received from said AV output device and outputting the reproduced video signal to said display unit; and
second control for performing notification, when a control signal for notifying occurrence of an interrupt event which starts without any user operations and which disables output of the video signal is received from said AV output device during execution of said first control, using the notification information stored in said memory selected based on said control signal,
said AV input device performs the notification by displaying said notification information on said display unit in accordance with the control signal for notifying the occurrence of said event, also after the reproduction of said video signal is stopped, and
when a control signal corresponding to completion of processing of the predetermined event is received from said AV output device after the execution of said second control, said AV input device terminates said notification by said display unit.

4. A notification method in an AV (Audio Visual) output system including an AV output device and an AV input device, comprising the steps of:
reproducing and displaying a video signal in a display unit of said AV output device;
outputting said video signal and a control signal from said AV output device to said AV input device;
reproducing and outputting said video signal in a display unit of said AV input device;
when occurrence of an interrupt event, which starts without any user operations, is detected during processing of reproducing and outputting said video signal by said AV output device, stopping the output of said video signal from said AV output device to said AV input device after outputting a control signal for notifying the occurrence of said event to said AV input device;
when the control signal for notifying the occurrence of said event is received by said AV input device, performing notification by said display unit of said AV input device using notification information stored in a memory of said AV input device selected based on said control signal, the step of performing said notification performing the notification in accordance with the control signal for notifying the occurrence of said event, also after the reproduction of said video signal is stopped;
when processing of said event is completed in said AV output device, outputting a control signal corresponding to completion of the processing of said event from said AV output device to said AV input device; and
when the control signal corresponding to the completion of the processing of said event is received in said AV input device, terminating said notification by said display unit of said AV input device.

5. The AV output system of claim 1, further comprising a plurality of AV output devices, wherein each said AV output device is configured to transmit the control signal for a respective notification information, wherein the control signal is the same for each AV output device, except for a unique identifier for each AV output device.

6. The AV output system of claim 5, wherein a first said AV output device has an output unit outputting a video signal to said AV input device, and when a second said AV output device incurs an interrupt while the video is being output to said AV input device, the second said AV output device outputs a control signal corresponding to the occurrence of an event that is the cause of the interrupt.

* * * * *